Dec. 30, 1958 W. A. NUTTY 2,866,420
ICE CREAM STICK MACHINE
Filed May 11, 1950 4 Sheets-Sheet 1

Inventor
William A. Nutty
By Stice & Stice
Attys.

Inventor.
William A. Nutty.

Dec. 30, 1958 W. A. NUTTY 2,866,420
ICE CREAM STICK MACHINE
Filed May 11, 1950 4 Sheets-Sheet 3
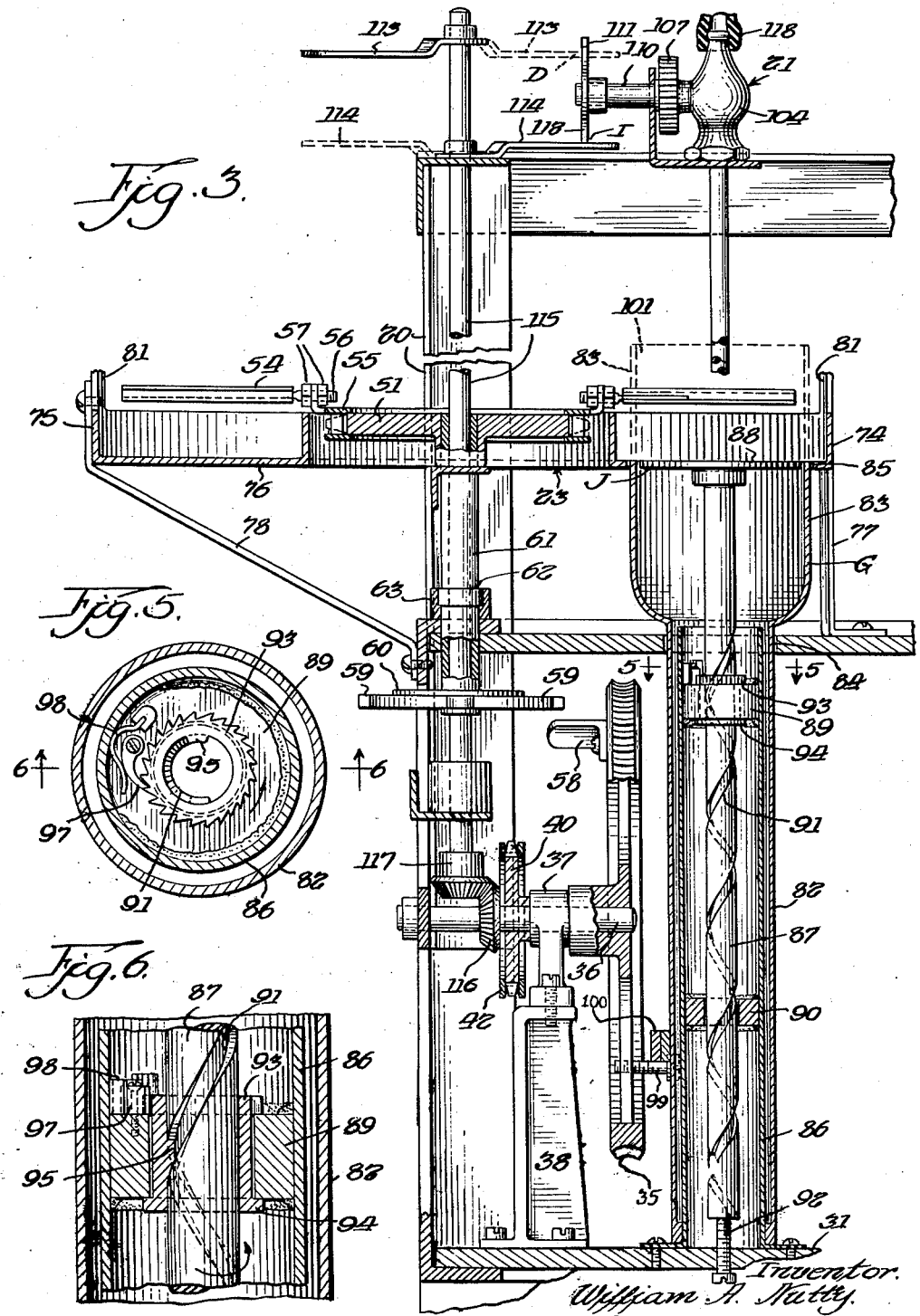

Dec. 30, 1958
W. A. NUTTY
2,866,420
ICE CREAM STICK MACHINE
Filed May 11, 1950
4 Sheets-Sheet 4
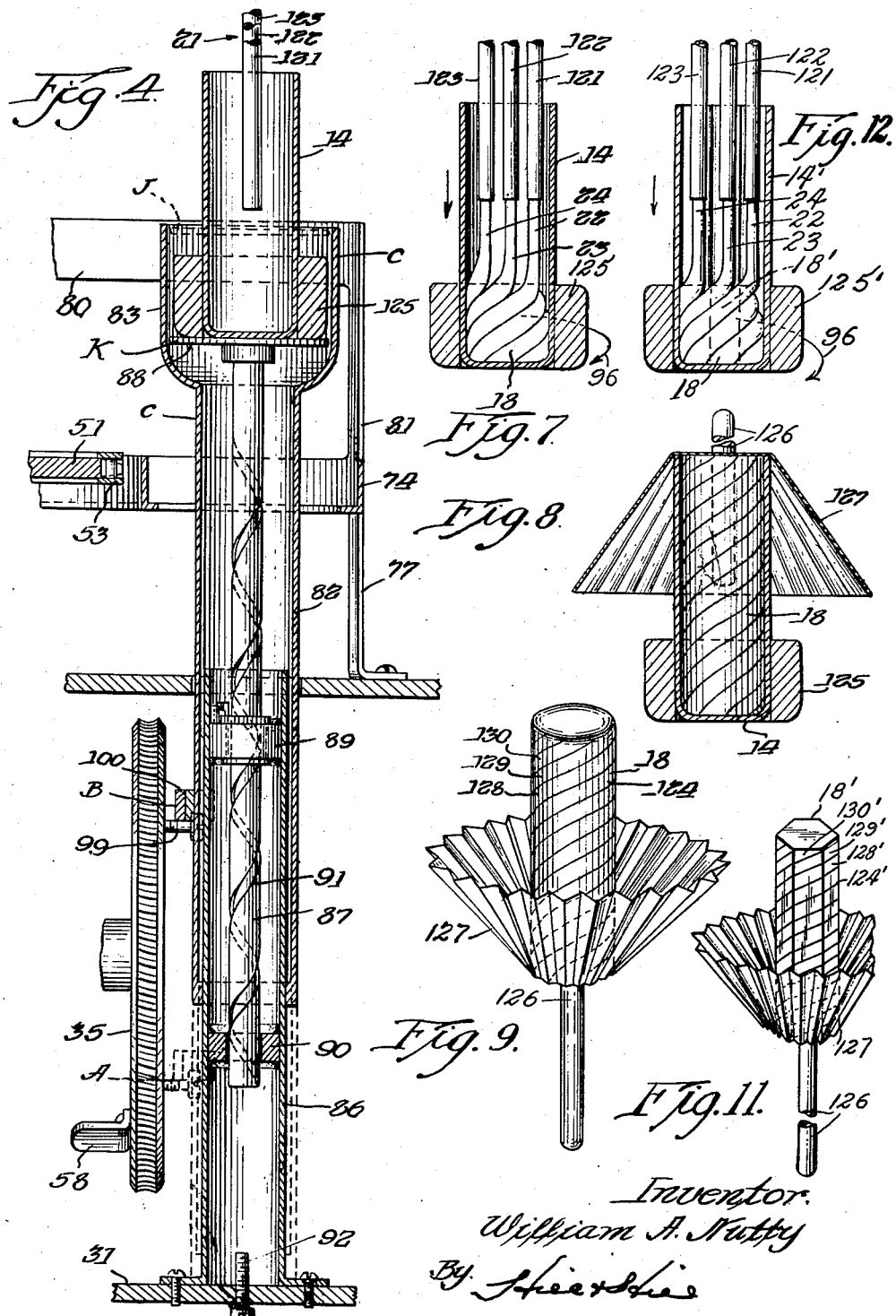

United States Patent Office 2,866,420
Patented Dec. 30, 1958

2,866,420

ICE CREAM STICK MACHINE

William A. Nutty, Chicago, Ill.

Application May 11, 1950, Serial No. 161,438

15 Claims. (Cl. 107—1)

This invention relates to a method and apparatus for forming an ice cream novelty, and more particularly to an ice cream bar or edible comestible in the form of a stick composed of a number of flavors or colors of ice cream molded in a manner to produce an ornamental surface having a spiral or "barber pole" appearance.

A principal object of the invention is to provide an ornamental frozen confection or edible comestible having not only an ornamental surface having eye appeal, but also taste appeal by providing multiple flavors in the same confection.

A further object of the invention is to provide a frozen confection in which there may be embedded a stick for ease in eating and also provided with a wrapper or container adapted to catch the drippings or fragments from the confection while it is being consumed.

Another object of the invention is to provide a suitable wrapper and stick for a frozen confection which may be simply applied by hand or automatic machinery and which may be readily opened for consumption of the frozen comestible.

Another object of the invention is the provision of a suitably wrapped frozen comestible which offers sanitary protection from the point of manufacture and packaging thereof when it is consumed.

Still another object of the invention is to provide a frozen comestible with a suitable wrapper and stick for eating which eliminates the need for serving therewith of a napkin used to guard against the drippings.

Another object of the invention is to provide an automatic mold filling machine in which all movements are synchronized for forming a frozen comestible or confection with one or more flavors of an extruded confection and the like to form spiral or helical layers of the frozen comestible for ornamentation of the resultant molded confection.

Another object of the invention is to provide a novel method of generating a molded frozen confection formed from an extruded plasticized or frozen comestible and with spiral or helical layers of the confection to provide an ornamental surface for the confection.

Another object of the invention is to provide an important method of forming a frozen ice cream bar from a plurality of different flavored or colored ice creams by generating the different flavors or colored ice creams into spiral or helical layers of ice cream to provide an ornamental ice cream bar.

Another object of the invention is to mold a cylindrically shaped comestible from frozen ice cream or other analogous products, continuously delivered under pressure and sufficiently stiff that the ice cream or products do not promptly seek their own level, into spiral layers of the frozen ice cream or other analogous products.

Another object of the invention is to provide an improved method, apparatus and resultant product by molding a plasticized comestible having suitable stiffness by generating helical layers of the plasticized comestible within a suitable mold by moving the mold with respect to the ejected plasticized comestible, after which the mold is removed from the comestible, and the resultant molded product is frozen.

Another object of the invention is to provide an improved apparatus for molding a plasticized comestible into spiral or helical layers, successively advancing the mold to another station, and delivering an empty mold to be filled to the filling station.

Still another object of the invention is to provide in combination with a freezer for delivering a semi-frozen plasticized ice cream or other comestible, an improved apparatus for molding a frozen confection in a predetermined cycle from the time the mold is delivered to a filling station, spirally or helically molding the frozen confection, discharging the molding confection from the filling station, delivering the molded confection to a freezing room, and delivering an empty cooled mold from a cooler room to the filling station.

Another object of the invention is to provide improved means for spirally or helically filling a mold.

In carrying out the present invention, an automatic molding machine is provided with a filling station, suitable molds to be successively delivered to the filling station as the molds are filled, means for generating spiral or helical layers of the ice cream or other plasticized comestible into the mold, means for automatically raising and lowering the mold with respect to the means of ejecting the plasticized material within the mold as it is spirally or helically generated into a completed product. There is also provided novel means for advancing the mold from the filling station to suitable conveying means for discharging the mold and for conveying the resultant product from the mold to a freezer room together with conveying means for returning the mold which has been cooled from a cooling room, and means for advancing the mold to a filling station. The apparatus also includes novel mechanism for timing the various cycles of operation of parts of the apparatus which includes the period of advancing the mold to a filling station, the cycle of raising and lowering the mold during the filling thereof, the cycle of controlling the period of ejection of the material to be molded, and the cycle of discharging the mold from the filling station to the point of discharge to the means for conveying the molded product to a freezer room. The apparatus also includes means for advancing a mold, step by step, to a filling station where the mold is filled, after which it is discharged step by step in the same cycle as it is advanced to the filling station.

All the movements of the apparatus are synhcronized and produced by suitable gearing in the form of a main gear driven by a suitable motor so that for each revolution of the main gear, a conveyor for the mold advances the mold to a filling station, the mold is filled and discharged from the filling station, and another mold is advanced to the filling station, whereupon the cycle is repeated successively for any number of molds. As the main gear revolves, a mechanism is provided for conveying molds from a cooler room to the automatic filling machine and also for operating a conveyor for discharging the molded product to a freezer room.

Other objects and advantages will appear in the course of the specification and with all of said objects and advantages in view, this invention consists in the several novel features of construction, arrangement and combination of parts hereinafter fully set forth and more particularly defined in the appended claims.

The invention is clearly illustrated in the drawings accompanying the specification, in which:

Fig. 1 is a view in side elevation illustrating the automatic molding apparatus for forming the ice cream novelty from spiral or helical layers of frozen ice cream and the like;

Fig. 3 is a view in elevation, partly in section, taken along the line 3—3 of Figs. 1 and 2, looking in the direction of the arrows illustrating the mechanism for generating the extruded frozen ice cream and the like into spiral or helical layers thereof;

Fig. 4 is a view in elevation, partly in section, illustrating the means for spirally or helically molding the layers of extruded comestible with a mold mounted in position thereon;

Fig. 5 is a horizontal sectional view taken along line 5—5, looking in the direction of the arrows, illustrating the mechanism for permitting the mold to rise to the position for filling without rotating and allowing the mold as it descends to rotate, spirally or helically forming the streams or extruded material within the mold;

Fig. 6 is an enlarged vertical sectional view taken along line 6—6 of Fig. 5 looking in the direction of the arrows, illustrating the mechanism permitting the raising of the mold into filling position and rotating the mold in its downward movement for helically or spirally winding the extruded materials into layers;

Fig. 7 illustrates a mold being filled with spiral or helical layers of plastic material as the mold moves downwardly;

Fig. 8 illustrates the completed frozen comestible showing the spiral or helical layers of the extruded comestible within the mold at the stage at which a stick for eating and a wrapper therefor to catch the drippings is added prior to the removal from the mold;

Fig. 9 illustrates a completed ice cream novelty in the form of a prism showing the ornamental spiral or helical surfaces provided with a stick for eating and a collapsible wrapper for catching the drippings;

Fig. 10 illustrates the position of the mechanism for timing the period of operation of the valves of the ejecting means;

Figures 1, 10:
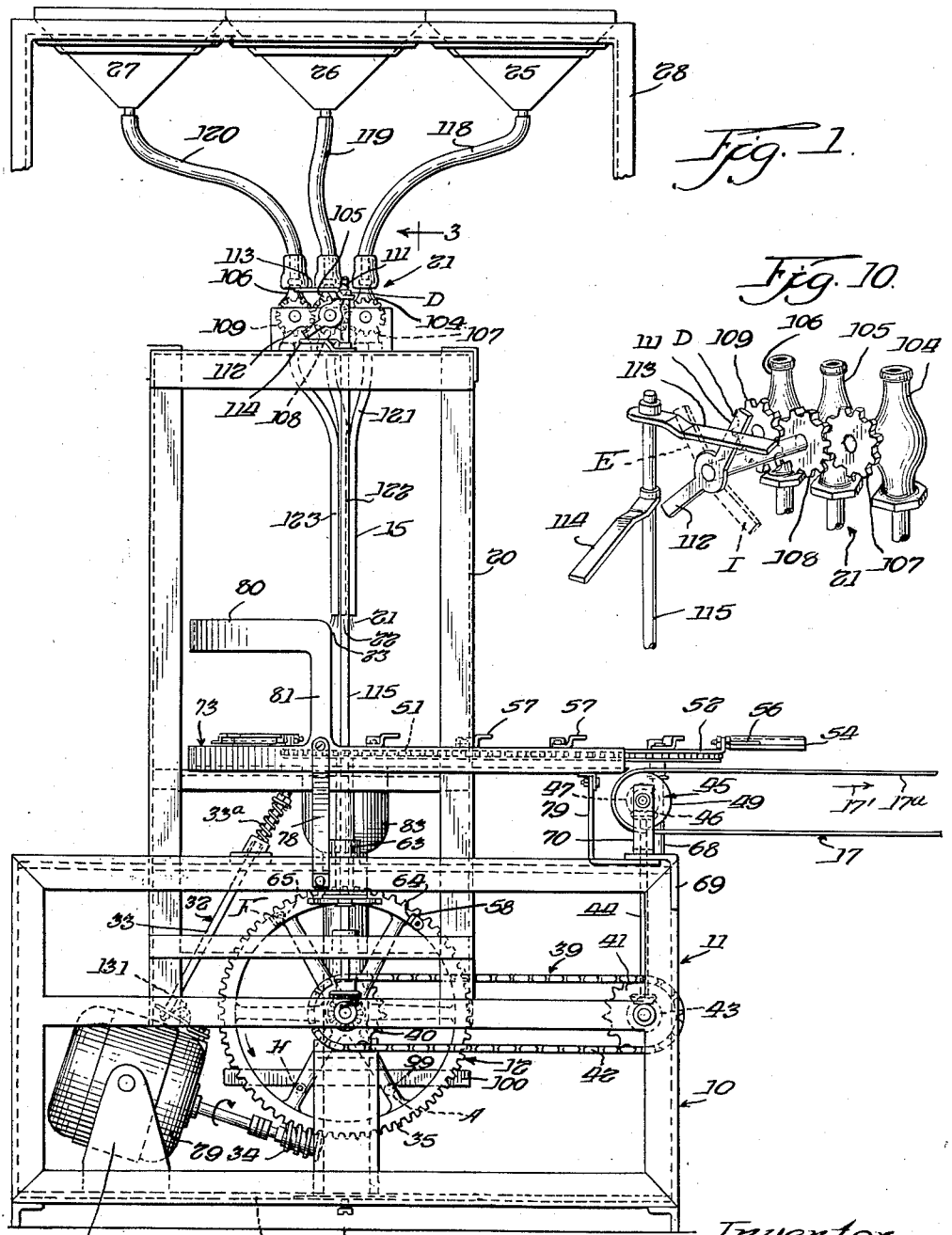

Fig. 11 illustrates a completed ice cream novelty in the form of a prism showing the ornamental spiral or helical surfaces provided with a stick for eating and a collapsible wrapper for catching the drippings; and Fig. 12 illustrates a mold in the shape of a prism being filled with spiral or helical layers of plastic material as the mold moves downwardly to form the prism-shaped novelty of Fig. 11.

Referring to the drawings which are merely illustrative of one form of the present invention, an automatic mold filling machine 10, is provided with a base 11, for mounting driving mechanism 12, for actuating the mold filling machine together with conveying mechanism 13, for delivering a plurality of molds 14, in successive stages to a mold filling station 15 and discharging the molds from the mold filling station after the filling has been completed. A conveyor 16 is provided for delivering the molds 14, from a cooler room (not shown) in the direction of the arrow 16' to the conveying mechanism 13, of the mold filling apparatus. Conveying means 17 is provided for delivering the finished mold product 18, and the molds 14, to a freezer room (not shown) in the direction of the arrow 17'.

A super structure 20 suitably affixed to the base structure 11, as shown in Figs. 1 and 4 is adapted to mount the ejecting mechanism 21 for extruding or discharging a plurality of streams 22, 23, and 24, Fig 7, of ice cream or other analogous products which is sufficiently stiff that it does not promptly seek its own level in the mold 14. Different flavors of ice cream which may be suitably colored, as is well known in the art, may be delivered from hoppers 25, 26, and 27 mounted on a separate structure 28. Each of the hoppers may be connected to suitable apparatus (not shown) for delivering the ice cream from each of the hoppers 25, 26, 27 or other suitable plasticized confection or comestible under pressure.

Referring to Figs 1 to 4, the driving mechanism 12, preferably comprises a fractional horsepower electric motor 29 connected to a source of electrical energy (not shown). The motor is pivotally supported on a support bracket 30 mounted on a base member 31 of the base 11. A tensioning device or clutch 32 comprising a rod 33 and a spring 33a, Fig. 1, which resiliently biases a worm gear 34 affixed to the shaft of the motor in a suitable manner upwardly against a worm wheel 35. The tensioning device 32 also provides an overload release or clutch if any of the mechanism should be obstructed or overloaded causing stoppage of the mechanism.

The worm wheel 35 is affixed to a transverse shaft 36 journaled in a bearing 37 mounted on a support bracket 38. A chain and sprocket drive mechanism 39 comprising sprockets 40 and 41 and roller chain 42 drive the conveyor mechanisms 16 and 17 in opposite directions as shown by the arrows 16' and 17' through bevel gearing 43, a vertical shaft 44, and bevel gearing 45, Fig. 2. The bevel gearing 45 includes a bevel gear 46 connected to the shaft 44 and a bevel gear 47 affixed to a transverse shaft 48 and a bevel gear 47' loosely mounted on the shaft 48 for driving respectively a pulley 49, affixed to the shaft 48, and a pulley 50 journaled upon the shaft 48 to drive conveyor belts 17a and 16a respectively, in the direction of the arrows 17' and 16', Fig. 2. As the conveyors 16 and 17 are directly connected through the above gearing to the worm wheel 35, the conveyor belts 16a and 17a are driven at a predetermined speed governed by the ratio of the gearing and the speed of the worm wheel reduced through the worm gear drive from the motor 29.

Figure 2:
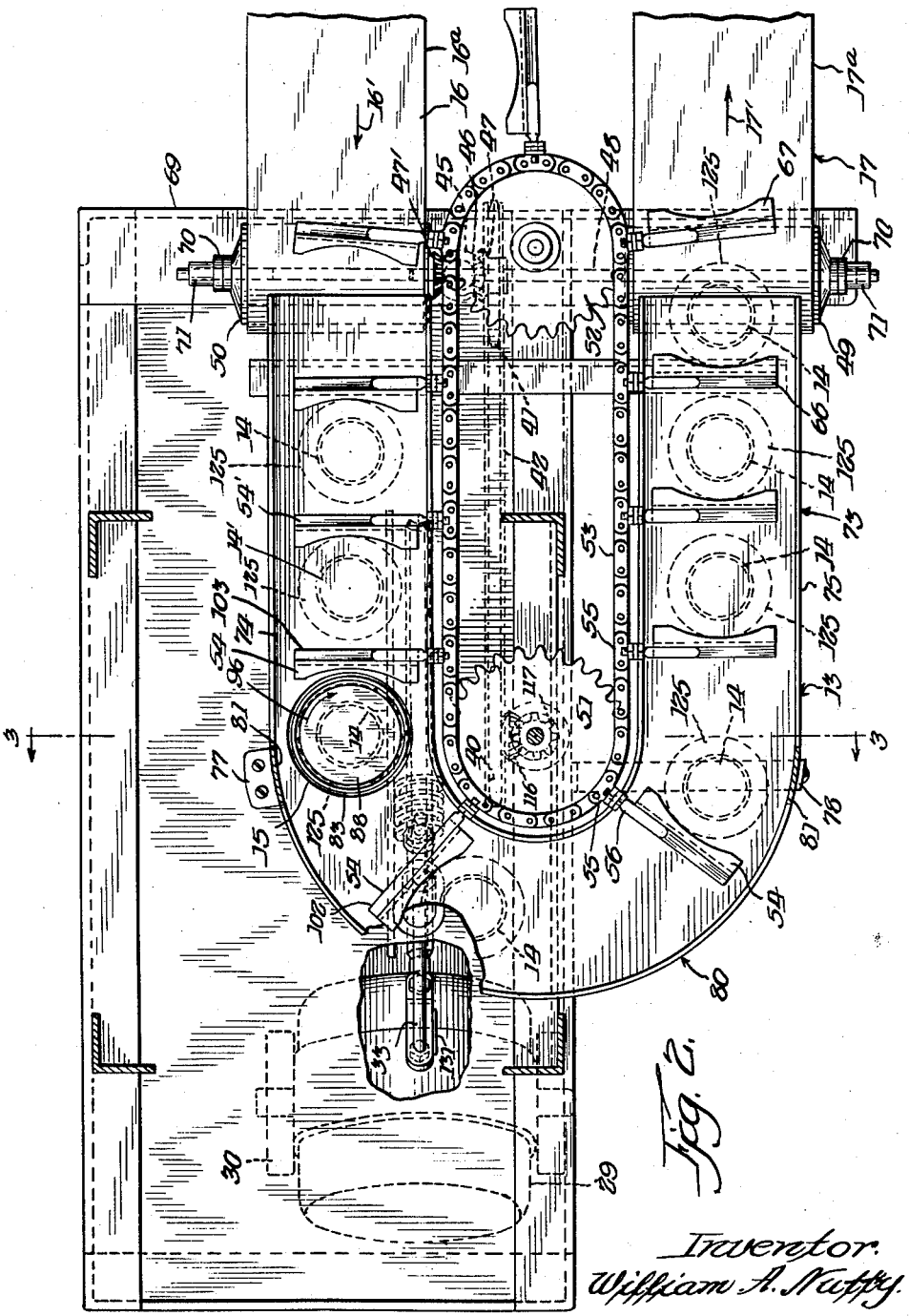
Fig. 2 is a plan view of the apparatus of Fig. 1.

The conveying mechanism 13 for advancing the molds 14 from the conveyor 16 in successive steps to the mold filling station 15 and discharging the molds in successive steps to the conveyor 17 is provided by sprockets 51 and 52, Figs. 1 to 4 and over which a roller chain 53 is positioned for advancing transverse lugs 54 formed, as shown in Fig 2, for engaging the molds 14 for advancing each of the molds in successive steps to and from the filling station 15. The transverse lugs 54 are adapted to be detachably mounted upon links 55 formed, as shown in Figs. 1 and 3. Referring to Fig 3, in order to detach the lugs 54 from the upturned link 55, a threaded portion 56 is affixed to the end of each of the transverse lugs 54 and lock nuts 57 affixing the lug 54 in position when the threaded end is inserted in the upturned end of the link 55.

The drive sprocket 51 is driven in a predetermined timed relation or cycle from the worm wheel 35 by a lug 58 affixed to the worm wheel and extending laterally therefrom, Figs. 1 and 3. The lug 58 is adapted to engage in successive rotations of the worm wheel laterally extending arms 59 arranged substantially 90° apart and affixed to a disc 60 for timing the period of rotation of the drive sprocket 51. The disc 60 is affixed to a hollow shaft 61 provided with a thrust collar 62 journaled in a bearing 63 supported on the frame 10, Figs. 1 and 3. At the upper end of the hollow shaft 61, the main drive sprocket 51 is affixed thereto in any suitable manner, so that upon the rotation of the worm wheel 35 from the position 64 of the lug 58 to the dotted position 65, one of the arms 59 has rotated through 90° advancing one of the transverse lugs 54 from the position 66, Fig. 2, to a position 67 and positioning another arm 59 to be successively engaged as the sprocket is rotated to the position 64 when it comes in contact with the arm 59. Upon the continuous rotation of the worm wheel, the molds 14 are advanced in steps to and from the mold filling station 15 and discharged therefrom.

The driven sprocket 52 is suitably journaled upon a support bracket 68 affixed to a transverse support member 69 in turn affixed to the base 11. The transverse support member 69 has affixed thereto vertical supports 70 provided with suitable bearings 71 for journaling the transverse shaft 48. The beveled gear 47 is affixed to the shaft 48 as is the pulley 49. The beveled gear 47' and the pulley 50 are journaled upon the shaft 48. With this construction, as the vertical shaft 44 is rotated, the belt 17a travels from the automatic mold filling machine, whereas the belt 16 travels toward the mold filling machine.

A U-shaped track construction 73 is provided having a bight portion 74 in alignment with the conveyor 16 and a bight portion 75 in alignment with the conveyor 17. The U-shaped track 73 is preferably formed from a U-shaped structural section, Fig. 3, to provide a base 76 to support the molds 14 as they travel through the apparatus from the incoming belt 16a to where they are discharged to the outgoing conveyor belt 17a. The track 73 is supported from the base 10 by suitable supports 77, 78, and 79. An arcuate guard 80 is suitably affixed to the outer upstanding legs of the track by vertical supports 81. The guard serves to prevent the molds 14 from tipping over as they pass from the arcuate portion of the track. Although the molds have been disclosed as moving in the direction shown, it is within the scope of the invention that they may move in the opposite direction by simply re-arranging the drive thereof.

Referring particularly to Figs. 1, 3, 4, 5, and 6, the novel mechanism for generating the streams of the plasticized confection or other comestible from the ejecting mechanism 21 into spiral or helical layers of the frozen confection and the like within a mold 14 during the mold filling operation will be described. A hollow carriage 82 having a cup-shaped member 83 at the upper end is slidably mounted vertically through an opening 84 in the base 11 and the cup 83 is slidably mounted through an opening 85 in the base 76. The openings 84 and 85 are in axial alignment. The center tube 86 affixed to the base member 31 journals the hollow carriage 82 as it moves vertically thereon from its lowest position as shown in Fig. 3 to its upper position as shown in Fig. 4.

A shaft 87 having a disc 88 at the upper end for the support of the mold 14 in the filling position is journaled in upper and lower supports 89, 90 affixed to the center tube 86. The shaft 87 is provided with a cylindrical cam or spiral gear 91 formed thereon as shown in Figs. 2 and 4. An adjusting screw 92 is provided for adjusting the level of the disc 88 to conform to the surface of the track 76 in its lowermost position, Fig. 3.

A ratchet member 93 journaled in the upper bearing 89 and having a collar 94 at the lower end to restrain the vertical movement, Fig. 3, is slidably journaled with respect to the shaft 87 as it is raised and lowered; and, as lug 95 is complementally formed to the cylindrical cam surface 91, it permits the shaft 87 to raise vertically from its lower position in Fig. 3 to Fig. 4 without rotating, and as it lowers to rotate in a clock-wise direction as shown by the arrow 96, Fig. 2. A pawl 97, Fig. 5, spring biased by a spring 98 and affixed to the upper support 89 permits the ratchet 93 to move in counter-clock-wise direction of the arrow, Fig. 5 so that the shaft 87 does not rotate in its upward vertical movement, but permits it to rotate in a clock-wise direction as the shaft descends since the pawl 97 locks the ratchet 93 preventing its rotation.

The shaft 87 then rotates downwardly under the influence of gravity in a clock-wise direction. The lost-motion connection between the worm wheel 35 and the carriage 82 is formed by a pin 99 affixed to a spoke of the worm wheel, Figs. 1 and 2, adapted to engage a cross arm 100 horizontally affixed to the carriage 82. In the position shown in Fig. 3, the carriage 82 is in its lowermost position with the disc 88 adapted to receive the mold 14; and in Fig. 4, the lost-motion connection provided by the pin 99 and cross arm 100 actuates the carriage 82 to raise the disc 88 on which is positioned the mold 14 to its uppermost position to receive the streams ejected from the ejecting mechanism 21 for filling the mold with spiral or helical layers of the ejected material, as illustrated in Fig. 7.

As the worm gear 35 rotates from the position H to the position A Fig. 1, there is no motion of the cross arm 100. At the position A, however, the pin 99 actuates the cross arm 100 so that the cup 83 is raised about the disc 88 with a mold located at the mold filling station 15, Fig. 2, and the transverse lug 54 located contiguous to the filling station 15, as shown. The cup 83 rises to the position with respect to the disc 88 as shown in Fig. 4. After which, further movement upwardly of the carriage 82 vertically raises the disc 88 to the position shown in Fig. 4 without any rotation of the shaft 87. From this position as shown in Fig. 4, the disc after the pin 99 reaches the top of its stroke and upon the mold being filled begins to travel downwardly and to rotate under the actuation of gravity due to the weight of the mold and the weight of the parts affixed to the disc. The ratchet and pawl mechanism 93 and 97 permits the disc to rotate in a clock-wise direction 96, Fig. 2, spirally filling the mold with the layers of the ejected material until the disc 88 reaches the bottom of the stroke as illustrated in Fig. 3. As the cross-arm 100 reaches the position substantially as shown in Fig. 1 in the position indicated at H, the disc 88 is in the lower position as shown in Fig. 3, but the cup 83 with respect to the disc 88 is substantially in the position above the disc as shown in Fig. 4. Upon further rotation of the worm wheel in the direction of the arrow, the cup continues to descend to the position from the dotted position 101, Fig. 3, to the solid position with the upper edge of the cup in alignment with the surface of the disc 88 with the carriage 82 in the position shown, Fig. 3. At this point, the carriage 82 is in its lowermost position and the pin 99 is out of engagement with a cross arm 100. As the pin 99 moves downwardly from the position H, there is no movement of the spiral generating mechanism because of the lost-motion connection. However, as the pin 99 approaches the lowermost position, the lug 58 for actuating the laterally extended arms 59 moves to the position 64 engaging one of the arms 59 rotating the arm 59 through an arc sufficient to rotate the drive sprocket 51 through 90° discharging the mold 14 from the top of the disc 88 at the filling station 15 so that the transverse lug 54 assumes a position 102, Fig. 2, from the position 103, and another transverse lug 54 moves another mold 14' from the position shown in Fig. 2 so that it is positioned upon the disc 88 by the lug 54'. It is obvious that there has been described a novel apparatus and a novel method of preparing a comestible or frozen confection such as an ice cream stick wherein two or more independent streams of a comestible to be spirally wound are flowed within a suitable mold, the independent streams are then suitably tiered by laying said streams one upon another in tiered relationship by winding the supported streams around the inner contour of the mold to complete the comestible or confection. As the cycle is repeated, molds are successively advanced from the conveyor 16 to the filling station 15 where they are filled and ejected and discharged to the conveyor 17.

The novel ejecting mechanism for ejecting one or more streams of comestible or other frozen confection comprises, referring to Figs. 1, 3, 4, and 7, the on and off valves 104, 105, and 106 which are actuated and geared together through gears 107, 108, and 109. The center gear 108 has a gear actuating means provided by a shaft 110 to which are positioned arms 111 and 112, Figs. 1 and 3.

A lost-motion connection between the arms 111 and 112 is provided by arms 113 and 114, Figs. 1 and 3, affixed to a shaft 115 driven from the worm wheel 35 through beveled gears 116 and 117. The lost-motion connection, between the arms 113 and 114 on the shaft 115 and the arms 111 and 112 for simultaneously actuating the valves 104, 105, and 106, from on to off position, is so timed that the valves are opened with the spiral generating mechanism in the mold position as shown in Fig. 4 and shut off when the mold is first positioned on the disc 88. The valves are shut off also as the mold is raised from the lowermost position, as shown with the disc 88 in the position in Fig. 3, to its raised position as shown in Fig. 4 being turned on as the mold is lowered whereupon the valves are shut off when the disc 88 reaches the bottom of its stroke. The valves are turned on as the upper arm 113 engages the arm 111 and are in their fully opened position with the mold in the position as shown in Fig. 4 at the upper end of the stroke of the spiral generating mechanism. As the mold is lowered, the valves which are quick acting shut off as the lower arm 114 engages the arm 112 as the arms of 113 and 114 are rotated in a counterclockwise direction, so that the valves are completely shut off when the disc 88 reaches the bottom of this stroke and remain shut off until the cycle is repeated by the arm 113 engaging the arm 111.

During the ejection cycle, frozen comestible, for example, a frozen ice cream or other frozen confection, is continuously delivered from a pressure mechanism, preferably a pressure freezer adapted for continuously delivering a semi-frozen ice cream or other plasticized comestible under pressure (not shown) from the hoppers 25, 26 and 27 through flexible tubing 118, 119, and 120 which are encased preferably with suitable insulation (not shown). It is preferred to use a form of tubing which may be readily connected to the valves 104, 105, and 106 and disconnected therefrom for cleaning and sterilizing. The valves 104, 105, and 106 eject the frozen confection or other plasticized comestible material through the downwardly extending tubes 121, 122, and 123, also preferably encased as far as possible with suitable insulation (not shown), from which are discharged the streams of comestible material 21, 22, and 23, the tubes being so arranged, as shown in Fig. 7, that spiral layers of the comestible are formed as shown in Fig. 7 to completely form the resultant molded comestible 18 or confection and the like as shown in Fig. 9. Referring to Figs. 7 and 8, it is preferred to use with the mold 14 a complementally formed weight 125 to maintain the mold in its upright position as it travels on the conveyor 16 through the U-shaped track 73 of the automatic mold filling machine to be discharged upon the conveyor 17.

The molds are preferably chilled before being delivered to the automatic mold filling machine being conveyed from a cooler room (not shown) on the conveyor 16 whereupon they are automatically advanced and filled in the automatic mold filling apparatus. Afterwards, a stick 126 and a pleated conical-shaped cup 127 are mounted, as shown in Fig. 8, and the stick and confection frozen, after which the resultant comestible is removed from the mold in any well known manner. A suitable wrapper may be positioned over the confection with the pleated cup 127 collapsed thereunder to provide a sanitary cover after which the product is kept frozen at a low temperature for later distribution through vending machines which are refrigerated or the final product may be suitably packaged and refrigerated for sale through the usual commercial channels.

Although there has been shown a cylindrical mold 14 and the complementally formed weight 125 therefor, it is also within the scope of the invention that different shapes and forms and sizes of molds and weights therefor may be used without departing from the scope of the invention. Referring to Figs. 11 and 12, there is illustrated a modified form of ice cream novelty 18', prism-shaped in form and molded by the hexagonal prism-shaped mold 14'. For the purpose of illustration, a hexagonal mold and resultant comestible is shown. It is to be understood that it is within the scope of the invention that any polygonal-shaped prism may be used for the mold and the resultant comestible. It is within the scope of the invention that the shape of the mold 14 for making the cylindrical-shaped mold product 18 of Fig. 9 may be suitably tapered or to provide ease in removing the finished product from the mold and, similarly, the prism-shaped embodiment or finished mold product 18' of Fig. 11 may be tapered by a complementally formed mold 14' to permit ease in removal of the resultant product from the mold. The prism-shaped product 18' may be formed in the same manner as the product described with reference to Fig. 7 but, instead, a prism-shaped mold 14', Fig. 12, is substituted along with a weight 125' complementally formed to receive the hexagonal mold 14'. The streams 22, 23, and 24 are discharged from the downwardly extending tubes 121, 122, and 123 as described with reference to the disclosure of Fig. 7, the operation of the machine being the same.

Although this apparatus has been particularly disclosed for molding ice cream confections, with spiral layers of one or more flavors and colors of ice cream to provide an ornamental confection as shown in Fig. 9, for example, with spiral layers 128, 129, and 130 formed of chocolate, vanilla and strawberry ice cream, other combinations of colors and flavors will be obvious to those skilled in the art. Likewise the apparatus is equally adaptable for molding a novelty bar formed of layers of frozen ices or sherbets. Although separate layers of different flavors may be used, it is also obvious that combinations of one or two layers of the same confection may be used and that various other arrangements of the ejecting apparatus other than three tubes 121, 122, and 123 will be suggested.

Referring briefly to the various figures of the drawings, the complete operation of the device is as follows:

It is preferred to prepare with this automatic mold filling machine, an ice cream novelty which is in the form of an ice cream bar or stick composed of a number of flavors and colors of ice cream molded in a manner to produce a spiral or "barber pole" appearance. All movements, as particularly described above, are synchronized and produced by the main gear 35 being driven by the motor 29 through the worm gear 34. The motor is suitably energized and the worm gear 34 may be declutched from the worm wheel through the mechanism 32 connected to a suitably actuated lever (not shown) connected to a bracket 131.

Referring to Fig. 1, when the pin 99 reaches the position A, it goes in contact with the cross arm 100 which raises the arm to the position B, Fig. 4, and the carriage 82 to the position C, Fig. 4, which is the position for filling.

At this point, the shaft 115 moves the arm 113 at position D Fig. 1, and moves it to the dotted position E, Fig. 10. This opens the three valves 104, 105, and 106 permitting contents from the tubes 118, 119, and 120 which are in a plastic or semi-fluid state or flow into tubes 121, 122, and 123, discharging into the mold 14. The instant these valves are opened, the pin 99 on the main gear 35 has reached the position F, permitting the carriage 82 to descend to the position G, Figs. 1 and 3. As the carriage descends, the spiral gear 91, Figs. 3 and 4, is caused to rotate revolving the disc 88 clock-wise upon which the mold is resting in the direction of the arrow 96, Figs. 2 and 7. Although the mold is shown as rotating in the direction as indicated, it is obvious that other forms of mechanisms will suggest themselves to those skilled in the art for rotating the disc 88 in any direction or combination of directions.

Thus, as the carriage 82 descends, the ice cream flows into the mold 14. When the pin 99 has reached the position H, the descent of the carriage 82 is halted until the pin 99 reaches the position A. The instant the descent is stopped, the arm 114 has contacted the arm 112 at position I Fig. 10, to close the valves 104, 105, 106 stopping the flow of the extruded material into the mold 14. At the time the valves are closed, one of the four arms 59 attached to the hollow shaft 61 is contacted by the lug 58. This turns the drive sprocket 51 which drives the chain 53 to which is attached the series of lugs 54. As each of the lugs 54 is advanced, the lug contacts its particular mold, forcing each of the molds, as they are advanced, from the disc 88 and replacing it with an empty one. At this time, the pin 99 has reached the position A and the cycle is repeated. The carriage 82 on its upward stroke, does not raise the spiral gear 87 until the disc 88, at the position J Fig. 4, has reached the position K. This forms a receptacle for the mold 14 while the mold is being raised and lowered. At the end of downward stroke, the disc 88 returns to the position J, Fig. 3, so that the mold can be removed and replaced in the filling position by the lugs 54 attached to the sprocket chain 53.

It is obvious from the bove description that there has been described a novel apparatus and method for forming or preparing an ice cream confection and the like having spiral layers of one or more flavors and colors which is ornamental and attractive.

The resultant article prepared in accordance with the above disclosed method and apparatus may take many forms other than the cylindrical stick form as illustrated in Fig. 9. For example, the resultant article may be formed as a prism-shaped comestible 18', Fig. 11, by the prism-shaped mold 14' as described with reference to Fig. 12. The spiral layers of one or more flavors and colors of ice cream to provide an ornamental confection as shown in Fig. 11 are formed with spiral layers 128', 129', and 130' formed of chocolate, vanilla, and strawberry ice cream. Other combinations of colors and flavors will be obvious to those skilled in the art. The pleated conical-shaped cup 127 is applied to the modified prism-shaped comestible together with the stick 126 in the same manner as described with reference to the cylindrical-shaped comestible of Fig. 8. Although it is preferred to form the ice cream novelty with a pleated cone-shaped cup to catch the drippings and to prevent the rapid melting of the ice cream as it is eaten as the cup tends to prevent the warmer air from reaching the ice cream novelty, it is within the scope of the invention that the resultant ice cream stick may be fabricated without the cup. It is also evident that other forms of sticks 126 for holding the ice cream novelty and the like may be used without departing from the scope of the invention, the stick being inserted after the molded ice cream novelty and the mold leaves the molding machine. The frozen ice cream novelty or other form of comestible and the stick therefor are then frozen in the mold after which the frozen comestible with the stick affixed may be removed from the mold.

It is also evident that although the invention has been disclosed using tubular streams of the ejected confection or like comestible that other shapes of the ejected streams may be used, for example, a ribbon shaped stream, without departing from the scope of the invention.

Likewise, although the resultant confection has been illustrated as being formed with a plurality of spiral or helically arranged layers forming a completed confection, it is to be understood that it is within the scope of the invention that confection inserts of either fruits, nuts, or solid cores of ice cream and other edible material may be inserted in the mold about which the spiral or ribbon shaped layers may be extruded with the method and apparatus as above disclosed.

It is also to be understood that with the above method and apparatus as the ice cream, for example, is extruded that the rupturing of moisture films because of the expansion of the air within the ice cream mixture or other aerated frozen comestible is reduced. The frozen aerated confection is extruded from the tubes 121, 122, and 123 to the cross-section of the mold being filled so that there is a uniform distribution of any solid particles in the frozen confection.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. Apparatus for generating a molded comestible with spiral layers of comestible material comprising means for ejecting streams of comestible, a mold adapted to receive the streams of comestible, means for positioning the mold in stream receiving relation with respect to the means for ejecting the comestible including a support for the mold adapted to be raised and lowered, means for raising the support with respect to the means for ejecting the comestible with the mold remaining stationary and means for simultaneously lowering and rotating the mold whereby spiral layers of the ejected streams of the comestible are formed within the mold.

2. Apparatus for generating a molded comestible with helical layers of comestible material comprising means for ejecting streams of comestible, a mold adapted to receive the streams of comestible, means for positioning the mold in stream receiving relation with respect to the means for ejecting the comestible including a support for the mold adapted to be raised and lowered, means for raising the support with respect to the means for ejecting the comestible with the mold remaining stationary, means for simultaneously lowering and rotating the mold whereby helical layers of the ejected streams of the comestible are formed within the mold, and annular means operatively mounted on the aforesaid support and forming a cup-shaped support for the mold as the mold is raised and lowered during the mold filling operation.

3. Apparatus for forming a prism-shaped molded confection comprising means for ejecting a plurality of streams of plasticized confection, a mold mounted in stream receiving relation with respect to the means for ejecting and adapted to receive the streams of the confection, means for raising and lowering the mold with respect to the lower end of the means for ejecting the streams of the plasticized confection, valve means for ejecting the streams of plasticized confection in the raised position of the mold, means for opening the valve means for ejecting the streams of plasticized confection in the raised position of the mold, said means for raising and lowering the mold adapted for generating the ejected streams of the confection into spirally wound layers of the confection, whereby the molded confection conforms to the mold and is formed with an ornamental surface of the spirally wound layers of the confections.

4. Apparatus for generating a prism-shaped confection with spiral layers of ejected material comprising a mold mounted in an operative position to receive the ejected material, a support for the mold adapted to be raised without angular horizontal movement and lowered during the mold filling operation with angular movement, means for raising and lowering the mold and providing a cup-shaped support for the mold including a vertically movable carriage having a cup-shaped member having a lost-motion connection between the support for the mold and the cup-shaped end of the carriage, spiral gear means operatively connected to the support of the mold including a stationary member for mounting the spiral gear means, and a lost-motion connection between the means for operating the apparatus whereby, as the carriage is raised and lowered, a cup-shaped support is provided for the mold, the support for the mold is raised without movement and lowered with a rotating movement whereby spiral layers of the ejected material are formed within the mold.

5. Apparatus for forming a prism-shaped molded comestible having helically arranged layers of molded comestible comprising means for ejecting a plurality of streams of plasticized comestible, a mold filling station, a mold mounted in stream receiving relation with respect to the means for ejecting and adapted to receive the streams of the comestible, said mold adapted to be positioned at the mold filling station, means for moving the mold relative with respect to the means for ejecting the streams of plasticized comestible where, as the mold is filled, spiral layers of the molded comestible are formed, conveying means for moving a mold to and from the filling station in a predetermined cycle in which the mold is retained at the filling station during the filling of the mold, valve means for actuating the aforesaid means for ejecting whereby the amount of comestible material is controlled during the mold filling operation, power means for actuating the conveying means, the valve means and the means for moving the mold with respect to the ejecting means, and means for synchronizing the movement of the aforesaid means, whereby a prism-shaped molded comestible is generated with spiral layers of molded comestible and successive molds are advanced to and from the mold filling station and retained therein during the filling operation in a predetermined cycle.

6. The method of preparing a frozen comestible, which comprises the following steps: flowing two or more independent streams of a frozen confection within a mold, tiering said independent streams in supporting relationship, and winding said tiered arrangement of two or more independent streams about the inner contour of said mold.

7. The method of preparing a frozen comestible according to claim 6, wherein the mold is cylindrical, and the tiered arrangement is wound about the inner cylindrical face of the cylindrical mold.

8. The method of preparing a frozen comestible according to claim 6, wherein the mold is prism-shaped and the tiered arrangement is wound about the inner peripheral face of the prism-shaped mold.

9. The method of preparing a frozen comestible according to claim 6, wherein the two or more independent streams of frozen confection are different colored confections.

10. The method of preparing a frozen comestible according to claim 7, wherein the tiered arrangement is helically wound about the inner cylindrical face of the cylindrical mold.

11. The method of preparing a frozen comestible, which comprises the following steps: flowing two or more independent streams of a frozen confection within a prism-shaped mold, tiering said independent streams in supporting relationship, and spirally winding said tiered arrangement of two or more independent streams about the inner peripheral face of the prism-shaped mold.

12. The method of preparing an edible and ornamental comestible, which comprises the following steps: ejecting two or more independent and different colored streams of comestibles within a mold, superimposing said streams contiguous to each other, and winding said supported streams around the inner contour of the mold to complete the comestible and to give a spiral pattern to the independent an different colored streams.

13. The method of preparing the comestible according to claim 12, wherein the comestible comprises an inner core of another comestible which is first placed within the mold and coaxial with respect thereto, and said two or more independent and different colored streams are concentrically wound with respect to the inner core of said another comestible.

14. The method of preparing an edible and ornamental comestible according to claim 12, wherein the two or more independent and different colored streams of comestibles are first plasticized before ejecting.

15. The method of forming an ice cream stick, which comprises the following steps: plasticizing two or more independent streams of different flavors of ice cream, flowing the two or more independent streams of different flavors of ice cream within a mold, tiering said independent streams of different flavors of ice cream in supporting relationship, and winding said tiered arrangement of two or more independent streams of different flavors of ice cream about the inner contour of the mold so that the resultant form of stick of ice cream has an ornamental surface formed by the tiered arrangement of the different flavors of ice cream, whereby the ice cream stick is ornamented with two or more alternate bands of different colors and flavors.

References Cited in the file of this patent
UNITED STATES PATENTS

| | | |
|---|---|---|
| 259,542 | Holmes | June 13, 1882 |
| 696,536 | Baker et al. | Apr. 1, 1902 |
| 914,711 | Erickson | Mar. 9, 1909 |
| 961,090 | Anderson | June 14, 1910 |
| 1,196,865 | Hollesten | Sept. 5, 1916 |
| 1,236,837 | Granlund | Aug. 14, 1917 |
| 1,274,606 | Salerno | Aug. 6, 1918 |
| 1,285,402 | Salerno | Nov. 19, 1918 |
| 1,323,949 | Bausman | Dec. 2, 1919 |
| 1,331,693 | Bunde | Feb. 24, 1920 |
| 1,451,031 | Speck | Apr. 10, 1923 |
| 1,460,825 | Peters et al. | July 3, 1923 |
| 1,576,339 | Laskey | Mar. 9, 1926 |
| 1,667,335 | Varkas et al. | Apr. 24, 1928 |
| 1,709,280 | Ost | Apr. 16, 1929 |
| 1,744,884 | Greiner | Jan. 28, 1930 |
| 1,783,402 | Cahoon | Dec. 2, 1930 |
| 1,830,425 | Crosland | Nov. 3, 1931 |
| 1,960,456 | Robb | May 29, 1934 |
| 2,032,812 | Quattrin et al. | Mar. 3, 1936 |
| 2,062,277 | Routh | Nov. 24, 1936 |
| 2,113,575 | Decker | Apr. 12, 1938 |
| 2,177,375 | Parcell | Oct. 24, 1939 |
| 2,188,418 | Routh | Jan. 30, 1940 |
| 2,246,871 | Balch | June 24, 1941 |
| 2,284,651 | Gundlach et al. | June 2, 1942 |
| 2,288,970 | Weisbender | July 7, 1942 |
| 2,289,326 | Howser | July 7, 1942 |
| 2,344,901 | Routh | Mar. 21, 1944 |
| 2,450,364 | Smith | Sept. 28, 1948 |
| 2,629,346 | Johansen | Feb. 24, 1953 |